Nov. 20, 1934.   R. J. STATZ   1,981,476
AUTOMOBILE WHEEL GAUGE
Filed Jan. 30, 1930
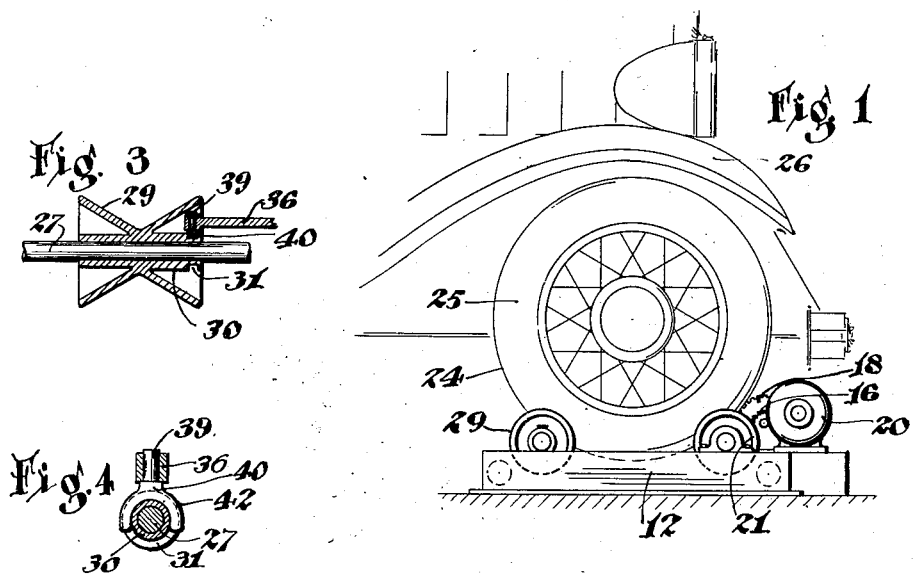
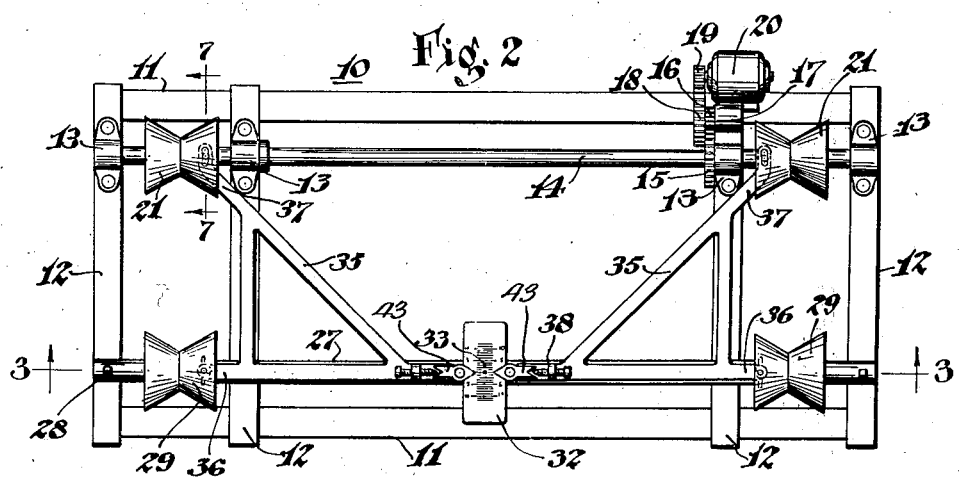
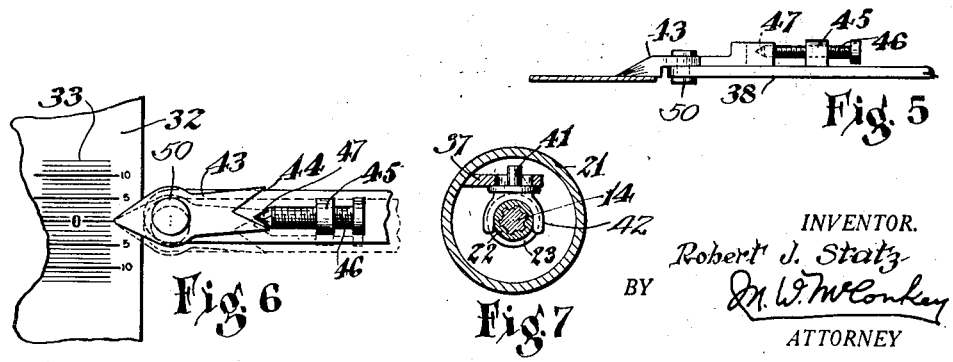
INVENTOR.
Robert J. Statz
BY
ATTORNEY Patented Nov. 20, 1934

1,981,476

UNITED STATES PATENT OFFICE 1,981,476

AUTOMOBILE WHEEL GAUGE

Robert J. Statz, South Bend, Ind., assignor to Bendix-Cowdrey Brake Tester, Inc., Fitchburg, Mass., a corporation of Delaware Application January 30, 1930, Serial No. 424,687

13 Claims. (Cl. 33—203)

This invention relates to gauges and more particularly to gauges for vehicle wheels.

An object of the invention is to provide a gauge for truing or aligning in parallelism the wheels of a motor vehicle so constructed that a vehicle may be easily and quickly positioned thereon for adjustment of the wheels.

A still further object of the invention is to provide a gauge for truing the wheels of a motor vehicle so that they may be brought into proper alignment or parallelism, which is positive in action, highly efficient in operation and yet of marked simplicity as a whole and in respect to each of its component parts, so that its manufacture may be economically facilitated both as regards the parts and their assembly.

Other objects of the invention will appear from the following description taken in connection with the drawing which forms a part of this specification, and in which:

Figure 1 is a side elevation of the gauge with a motor vehicle in position thereon;

Figure 2 is a top plan view;

Figure 3 is a detailed view substantially on line 3—3, Figure 2;

Figure 4 is a detailed view illustrating the connection between one of the spools and the oscillatory member connected thereto;

Figure 5 is a detailed view illustrating the pointer and means of adjustment therefor;

Figure 6 is an enlarged top plan view illustrating the scale and the pointer together with its adjustment means; and Figure 7 is a sectional view substantially on line 7—7, Figure 2.

Referring to the drawing for more specific details of the invention, 10 represents generally a frame comprising parallel members 11 connected by cross members 12. The cross members 12 are arranged in pairs adjacent to the respective ends of the members 11 and mounted for rotation on the cross members 12 in suitable bearings 13 is a shaft 14. This shaft has keyed thereon a gear 15 in mesh with a pinion 16 mounted for rotation on a suitable bracket 17, and the pinion 16 is formed integral with a gear 18 in mesh with a pinion 19 keyed on the shaft of a suitable motor 20. This driving connection between the motor and the shaft may be of any suitable gear reduction type, so that the rate of rotation of the shaft will be comparatively low.

Spools 21 are positioned on the shaft 14 between the respective pairs of cross members 12. These spools are suitably splined to the shaft, so that they rotate therewith and are free for longitudinal movement within certain limitations. The spools 21 are provided with hubs 22 having circumferential grooves 23, the object of which will hereinafter appear. These spools are arranged in spaced relation to receive the tread of the tires 24 positioned on wheels 25 mounted on an axle of a motor vehicle 26.

A shaft 27 is positioned on the frame 10. This shaft is arranged in spaced relation to the shaft 14 and secured against rotation by bolts 28 passing diametrally through the shaft and through the cross members 12. Positioned on the shaft 27 between the respective pairs of cross members 12 are spools 29. These spools are free for rotation and for longitudinal movement and are normally in alignment with the spools 21. As shown, the spools 29 are provided with hubs 30 having circumferential grooves 31. The shaft 27 also has positioned thereon centrally between the spools 29 a plate 32 calibrated as indicated at 33.

Corresponding oscillatory members 35, having arms 36, 37 and 38, are arranged in oppositely disposed relation. The arms 36 are pivoted on trunnions 39 formed on a yoke 40 engaging the circumferential grooves 31 on the hubs of the spools 29. The arms 37 are slotted to receive trunnions 41 formed on a yoke 42 engaging the circumferential grooves 23 on the hubs of the spools 21, and pivoted to the arms 38 are pointers 43 adapted to engage the plate 32 on opposite sides of the calibrated scale 33.

The pointers 43 are each provided with a V-shaped notch 44, and mounted to travel in a boss 45 formed on the arms 38 are set screws 46 having conical end portions 47 adapted to engage the notches 44. The pivotal connections 50 between the pointers 43 and the arms 38 provide means for maintaining the pointers in fixed relation to the scale, notwithstanding the wobble imparted thereto through the wheels of the vehicle under adjustment. The relative movement between the arms 38 and the pointers 43 is limited by the set screws 46. When the screws are adjusted to compensate for the wobble in the wheels the pointers remain fixed and the intensity of the wobble is indicated by the degree of adjustment of the set screws. Pointers 43 preferably have frictional engagement with plate 32 and register on scale 33, the mean position of screw 46 within the notch 44, which may be taken as representing the plane of rotation of the wheel undergoing test. If, by chance, the wheel does not wobble, screw 46 may be adjusted to contact with both sides of the notch and cause pointer 43 and arm 38 to move as a unit.

In operation, a motor vehicle is placed on the gauge with oppositely disposed wheels resting on the oppositely disposed pairs of rollers 21 and 29. The motor 20 is then set in operation to rotate the shaft 14. This shaft drives the spools 21 which set in rotation the wheels of the vehicle, through which the spools 29 are rotated. As the wheels rotate, the spools 21 and 29 adjust themselves on their respective shafts 14 and 27 to the plane of rotation of the wheels. As the spools 21 and 29 adjust themselves on the shafts 14 and 27, the oscillatory members 35 are moved to indicate, through the pointer 43 co-operating with the scale 33, the plane of rotation of the wheels.

The pivotal connection between the arms 38 and the pointers 43 compensates for any wobble that may be transmitted to the pointers from the wheels of the vehicle, and the set screws 46 may be adjusted, so that the pointers 43 may remain in a fixed position with respect to the scale 33, regardless of any wobble imparted by the wheel that is of less magnitude than the clearance between screw 46 and the notch 44, hence an exact reading of the degree of disalignment or the plane of rotation of the wheels may be ascertained irrespective of the wobble of the wheels, and the degree of the wobble of the wheels may be readily ascertained by the adjustment required on the set screws.

Although this invention has been described in connection with certain specific embodiments, the principles involved are susceptible of numerous other applications that are readily apparent to persons skilled in the art. The invention is, therefore, to be limited only as indicated by the scope of the appended claims.

Having thus described the various features of my invention, what I claim as new and desire to secure by Letters Patent is:

1. A gauge for indicating the planes of rotation of wheels comprising a shaft mounted for rotation, a fixed shaft arranged in parallel relation to the rotatable shaft, spools mounted on the shafts in pairs, said spools being mounted to adjust themselves to the plane of rotation of the wheels, a scale and members connected to each of the respective pairs of spools and co-operating with the scale for indicating the planes of rotation of the respective wheels.

2. A gauge for indicating the planes of rotation of wheels comprising a shaft mounted for rotation, a fixed shaft positioned in parallel relation thereto, spools arranged in pairs on the respective shafts and adapted to support oppositely disposed wheels, said spools being axially slidable on the shafts, means for driving the wheels through certain of the spools, a scale and members connecting the spools of each pair and cooperating with the scale for indicating the planes of rotation of the wheels.

3. A gauge for indicating the planes of rotation of wheels comprising two pairs of spools adapted to support oppositely disposed wheels and to adjust themselves to the planes of rotation of the wheels, a scale, movable members connecting the spools of each pair, pointers carried by the members movable relative thereto and co-operating with the scale, and means for limiting the movement of the pointers with respect to the members.

4. A gauge for indicating the planes of rotation of wheels comprising two pairs of spools adapted to support oppositely disposed wheels and to adjust themselves to the planes of rotation of the wheels, a scale, movable members connecting the spools of each pair, pointers pivoted on the movable members and co-operating with the scale, and means for regulating the movement of the pointers with respect to the members including set screws having conical end portions engaging notches in the pointers.

5. A gauge comprising spaced rotatable axially movable supports for a wheel, a scale and means interconnecting the supports and cooperating with the scale to indicate the plane of rotation of the wheel.

6. A gauge comprising a pair of spaced rotatable axially movable supports for each of oppositely disposed wheels, a scale and a movable arm interconnecting the individual supports of each pair of the supports and cooperating with the scale for indicating the planes of rotation of the wheels.

7. A gauge comprising a pair of spaced rotatable axially slidable supports for each of oppositely disposed wheels, means for rotating the wheels through certain of the supports, a scale and movable means interconnecting the individual supports of each pair of the supports and cooperating with the scale for indicating the planes of rotation of the wheels.

8. A gauge comprising rotatable supports for a wheel, said supports being mounted to adjust themselves to the plane of rotation of the wheel, means for rotating the wheel through one of the supports, a scale and means connected to the supports and cooperating with the scale including a pivoted pointer having frictional contact with the scale and limited movement relative to the connecting means to indicate the planes of rotation of the wheel.

9. A gauge for indicating the planes of rotation of the wheels comprising two pairs of rotatable axially movable spools adapted to support oppositely disposed wheels, means for rotating the wheels through certain of the spools, a scale, and two members connected respectively to the pairs of spools and cooperating with the scale for indicating the planes of rotation of the wheels.

10. A gauge for indicating the planes of rotation of wheels comprising two pairs of spools mounted for rotation and longitudinal movement and adapted to support oppositely disposed wheels, means for rotating the wheels through certain of the spools, a scale, and two members connected respectively to the pairs of spools and cooperating with the scale for indicating the planes of rotation of the wheels.

11. A gauge for indicating the planes of rotation of wheels comprising a frame, a shaft positioned for rotation on the frame, a fixed shaft positioned upon the frame in parallel relation to the rotatable shaft, means for rotating the rotatable shaft, spools splined to the rotatable shaft and adapted for longitudinal movement, spools mounted for rotation and for longitudinal movement on the fixed shaft, a scale, and a pair of movable members each pivotally connected to one of the spools on the fixed shaft and to one of the spools on the rotatable shaft, said members cooperating with the scale to indicate the planes of rotation of the wheels.

12. A gauge for indicating the planes of rotation of wheels comprising two pairs of spools the pairs respectively adapted to support oppositely disposed wheels and to adjust themselves to the planes of rotation of the wheels, a scale, members connecting the spools of each pair respectively, and pointers pivoted on the members and cooperating with the scale for indicating the planes of rotation of the wheels.

13. A gauge for indicating the planes of rotation of wheels comprising two pairs of spools adapted to support oppositely disposed wheels and mounted to adjust themselves to the planes of rotation of the wheels, a scale and movable members connecting the spools of each pair and cooperating with the scale including means for preventing wobble imparted to the movable members through the wheel from affecting the indications of the movable members on the scale.

ROBERT J. STATZ.